A. J. MAXWELL.
Assignor to J. A. YANCEY.
BLANK BOOK.
No. 9,997. Reissued Jan. 3, 1882.
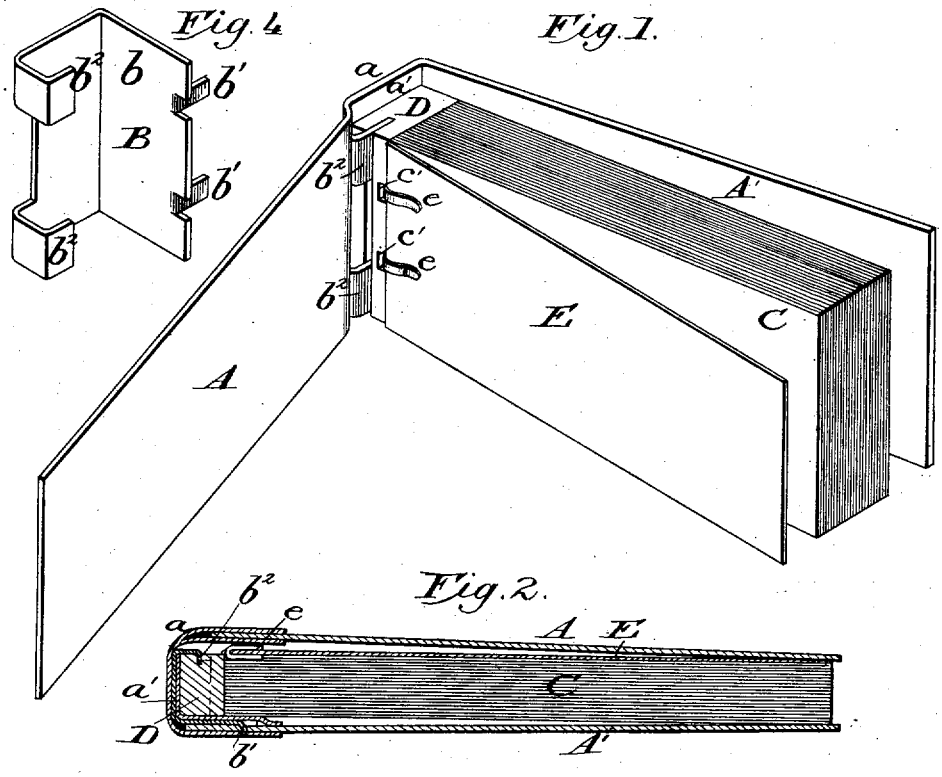
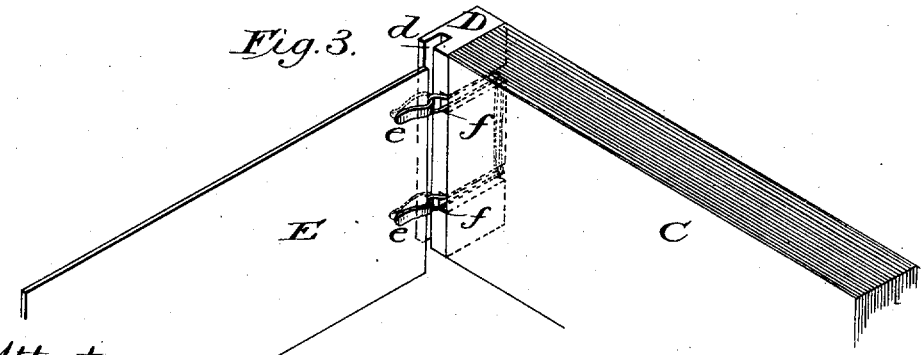
Attest.
Sidney P. Hollingsworth.
Jas H. Voorhies
Inventor.
Allan J. Maxwell,
By Stansbury & Munn
attorneys.
N. PETERS, Photo-Lithographer, Washington, D. C.

UNITED STATES PATENT OFFICE.

ALLAN J. MAXWELL, OF BOSTON, MASSACHUSETTS, ASSIGNOR TO JOSEPH A. YANCEY, OF RICHMOND, VIRGINIA.

BLANK-BOOK.

SPECIFICATION forming part of Reissued Letters Patent No. 9,997, dated January 3, 1882.

Original No. 216,799, dated June 24, 1879. Application for reissue filed November 28, 1881.

*To all whom it may concern:*

Be it known that I, ALLAN J. MAXWELL, formerly of Meadville, county of Crawford, State of Pennsylvania, now of Boston, Massachusetts, have invented certain new and useful Improvements in Blank-Books; and I do hereby declare the following to be a full and correct description of the same, reference being had to the accompanying drawings, in which—

Figure 1 is a perspective view of my improved blank-book. Fig. 2 represents a transverse section through the same. Fig. 3 is a perspective view of the pad and blotter with the cover removed, and Fig. 4 is a perspective view of the metal back detached.

Similar letters of reference denote corresponding parts wherever used.

My invention relates to that class of blank-books or tablets adapted for use with removable covers, which, when the leaves have been used, can be applied to other and similar tablets or stacks of leaves.

The invention consists, first, in a novel construction of the angular metallic back of the removable cover, adapting it to be readily and firmly secured to said cover, and to a removable pad having a rigid longitudinally-grooved backing; and, secondly, in a novel means for uniting the blotter to the pad or tablet, whereby it is maintained in proper relation to the pad as the leaves of the latter are successively used and removed, and whereby, also, it is adapted to be readily removed and replaced by a new one when desired, as hereinafter explained.

In the accompanying drawings, A A′ represent the covers, connected by a back, *a*, of leather, cloth, or other suitable flexible material, similar to the back and covers of an ordinary book. Within this backing *a*, and between the ends of the cover connected therewith, is secured an angular plate or back, B, (see Fig. 4,) made of thin metal, and bent at a right angle near about midway of its width, as shown. One side, *b*, of this plate is secured to one of the covers, A′, forming a rigid connection therewith, being provided with spurs *b′*, cut and turned up from the plate, and passing through perforations in the cover, and turned down or clinched on the outside thereof underneath the backing *a*, as shown in Fig. 2. The other portion of plate B, forming the metal back, is of a width conforming to the thickness of the book or pad, and is provided with arms $b^2$, bent forward and extending inward a short distance, where they are again bent inward at right angles, forming hooks or spurs, lying about parallel with the back B and opposite to and facing the rigid cover A′, as shown. The metal back thus formed is covered on the outside by the flexible back *a*, and on the inside, except the hooks or spurs $b^2$, by a similar covering, *a′*, which hides it from view and gives the cover the ordinary appearance and finish.

One cover, A′, as above stated, is rigidly connected with the angular plate or back B, while the other, A, is connected therewith only by the flexible backing *a a′*, and is free to fold over and away from the leaves or tablet, as desired. Where not required this flexible cover may be omitted.

C represents the tablet or stack of leaves, secured at one side or end to a rigid backing, D, of wood or other suitable material, from which the sheets can be readily removed in succession as they are used. The backing D is of a length about equal to the width of the sheets or leaves of the tablet, and has a groove, *d*, cut in it upon one side, extending between and open at one or at both ends, and at a distance from its outer edge conforming to the distance of the hooks or spurs $b^2$ from the metal backing B, adapting the latter to slide endwise into and to fill in snugly against the back B, with the hooks $b^2$ in the groove *d*, for holding it securely in place.

E is a blotter of the same size as the leaves of the tablet C, or thereabout, and secured thereto by means of an elastic band, *f*, and one or more little V-shaped spring clips or clamps, *e*. The block or back D has notches or recesses *c′ c′* cut across its face adjacent to the leaves C, and the elastic band *f* extends across the projection between and passes through the notches, and has the clips *e* secured to it, as shown in Fig. 3. The edge or end of the blotter is slipped between and grasped by the arms of the clips or clamps, which permit its ready withdrawal and renewal. At the same time the arrangement of the parts is such that as the leaves of the tablet are removed the elastic band draws the blotter forward or down, and keeps it in proper working relation to the part or leaves that remain, serving to keep them clean until used. An ordinary elastic band may be employed, and consequently it can be readily renewed when required.

By arranging the retaining hooks or spurs $b^2$ opposite to and facing or pointing toward the rigid side plate, $b$, or cover A′, it will be seen that the block D is firmly grasped between the two, and accidental displacement of the tablet is effectually prevented.

Having now described my invention, what I claim as new, and desire to secure by Letters Patent, is—

1. The angular metallic back B, having one rigid side, $b$, and hooks or spurs $b^2$, arranged opposite to and facing said rigid side, substantially as described.

2. The angular metallic back B, having one rigid side, $b$, and the retaining-hooks $b^2$, arranged opposite to and facing said rigid side, in combination with the grooved rigid back D, to which the tablet is secured, substantially as described.

3. The rigid backing D, to which the tablet is secured, provided with the notches $c'$ $c'$, in combination with the removable blotter, secured thereto by the elastic band $f$ and the removable clips $e$ $e$, substantially as described.

4. As a new article of manufacture, a renewable blotter-tablet consisting of a book or pad of paper provided with covers, and a blotter-sheet held by one or more spring-clips, $e$, flexibly attached by an elastic cord to the back of the binding, all in the manner described and shown.

In testimony that I claim the foregoing as my own invention I have hereunto set my hand in presence of two witnesses.

ALLAN J. MAXWELL.

Witnesses:
L. W. HOWES,
JAMES F. DILLON.